United States Patent
Lin

(10) Patent No.: US 7,946,716 B2
(45) Date of Patent: May 24, 2011

(54) IMAGING SYSTEM AND OPTICAL ENGINE

(75) Inventor: Hung-Ying Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 390 days.

(21) Appl. No.: 12/170,479

(22) Filed: Jul. 10, 2008

(65) Prior Publication Data
US 2009/0237809 A1 Sep. 24, 2009

(30) Foreign Application Priority Data
Mar. 21, 2008 (TW) ................................ 97110142 A

(51) Int. Cl.
G03B 21/28 (2006.01)
(52) U.S. Cl. ........................ 353/98; 353/102; 359/448
(58) Field of Classification Search ............... 353/50, 353/77, 98, 102; 359/448, 449, 455
See application file for complete search history.

(56) References Cited

U.S. PATENT DOCUMENTS
2004/0141241 A1 * 7/2004 Claytor .................... 359/742

FOREIGN PATENT DOCUMENTS
JP 06123920 A * 5/1994
* cited by examiner

Primary Examiner — Kevin Pyo
(74) Attorney, Agent, or Firm — Grossman, Tucker, Perreault & Pfleger, PLLC

(57) ABSTRACT

An imaging system and an optical engine comprising the imaging system are provided. The imaging system in this invention at least comprises a lens assembly, a light valve, and a Fresnel lens. The Fresnel lens is formed with a receiving portion adapted to correspondingly receive at least one portion of the lens assembly and replaces the conventional aspheric lens to focus a light ray onto the light valve. The light valve reflects the light ray into the lens assembly for imaging. Thereby, the Fresnel lens is adapted to decrease the surface area of the receiving portion to eliminate the influence of stray light on the imaging quality and to economize lens material costs.

9 Claims, 3 Drawing Sheets

IMAGING SYSTEM AND OPTICAL ENGINE

This application claims priority to Taiwan Patent Application No. 097110142 filed on Mar. 21, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to an imaging system and an optical engine, and more particularly, relates to an imaging system and an optical engine of a Non-Telecentric configuration.

2. Descriptions of the Related Art

Projection apparatuses have been widely used in governmental offices, companies, academic institutes and even at homes due to the decreasing costs over the years as a result of the advancement and market competition of the hi-tech industry. Among these projection apparatuses, the digital light processing (DLP) projection apparatuses is gradually replacing other projection apparatuses as the mainstream product. Because the DLP projection apparatus employs a digital micromirror device (DMD) as the primary element for processing and imaging a light ray from a light source into an image, luminance is improved and less exhaust heat is generated by the projection apparatus.

The conventional DLP projection apparatus (not shown) typically adopts an optical engine (not shown) of a Non-Telecentric configuration in an attempt to cut down the cost. As shown in FIG. 1, the optical engine comprises an imaging system 11, which further comprises a lens assembly 111, a DMD 113 and a reflective mirror 114. To simplify the structure of the light path, the imaging system 11 further comprises an aspheric lens 112 for focusing a light ray 10 onto the DMD 113. As shown, a light ray 10 received by the imaging system 11 is reflected by the reflective mirror 114 into the aspheric lens 112, which focuses the light ray 10 onto the DMD 113. Then, the light ray 10 is reflected by the DMD 113 into the lens assembly 111 to project the image. However, since the angle between the illumination section (from the DMD 113 towards the aspheric lens 112) and the imaging section (from the DMD 113 towards the lens assembly 111) in the light path is very small, the space is closely packed, causing mechanical interference of the aspheric lens 112 with the lens assembly 111. Consequently, in practice, the aspheric lens 112 must cut off a portion thereof to form a depression 112a for receiving a portion of the lens assembly 111. Because the aspheric lens 112 has a substantial thickness, the sectional surface forming the depression 112a also has a substantial area. Consequently, due to the arrangement angle, a portion of the light 10 impinged on the aspheric lens 112 will subject to total reflection (not shown) from the inner side of the sectional surface of the depression 112a and scattered into stray light which is hard to handle. The scattered stray light then enters into the lens assembly 111, which causes poor imaging quality.

Conventional designs have attempted to prevent the light ray 10 from impinging on the depression 112 and the inner side of the sectional surface thereof. Unfortunately, this may decrease the area where the light ray 10 impinges on the aspheric lens 112, i.e., to decrease the efficiency for utilizing the aspheric lens 112, thus adversely affecting the luminance performance of the optical engine. In view of this, efforts still have to be made in the field to mitigate the scattered stray light generated due to the use of the aspheric lens 112.

SUMMARY OF THE INVENTION

One objective of this invention is to provide an imaging system for a projection device. This imaging system is adapted to mitigate the influence of the stray light on the imaging quality.

Another objective of this invention is to provide an optical engine comprising the imaging system.

To this end, the imaging system comprises a lens assembly, a light valve and a Fresnel lens. The light valve has a reflective surface opposite to the lens assembly and the Fresnel lens. By replacing the conventional aspheric lens with the Fresnel lens of this invention, a light ray is focused onto the light valve and then reflected by the reflective surface into the lens assembly for imaging. The Fresnel lens is formed with a receiving portion adapted to correspondingly receive at least one portion of the lens assembly. The Fresnel lens is adapted to mitigate the influence of stray light on the imaging quality by reducing the surface area of the receiving portion as compared to the depression of the conventional aspheric lens. By using the Fresnel lens, the imaging system is adapted to mitigate the influence of stray light on the imaging quality and also to decease the costs of lens materials.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
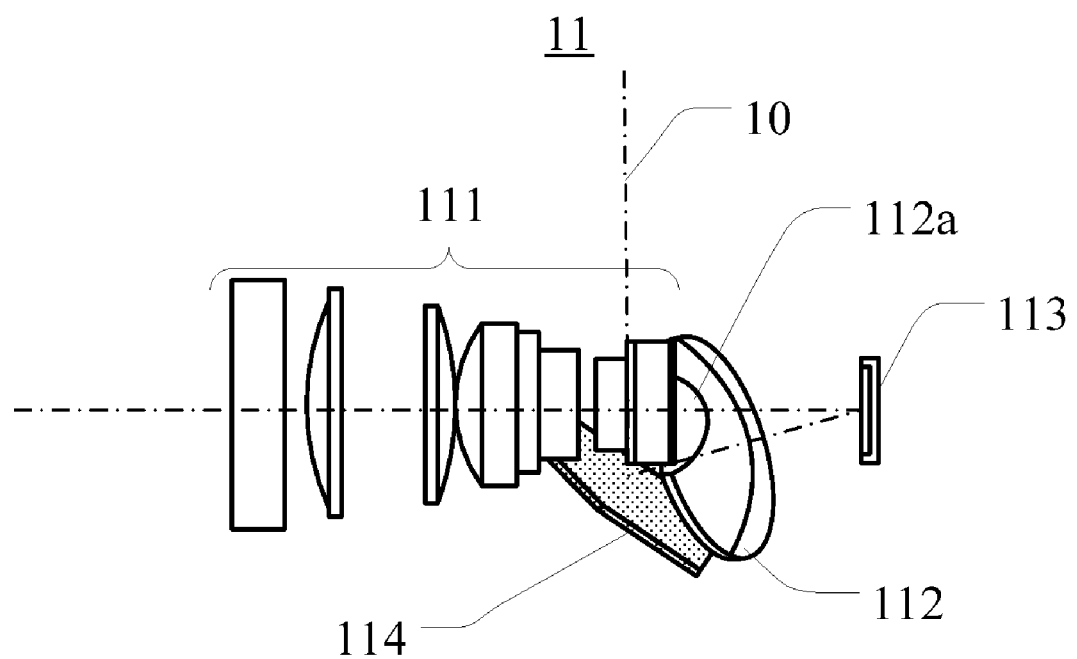
FIG. 1 is a schematic view of a conventional imaging system.
Figure 2:
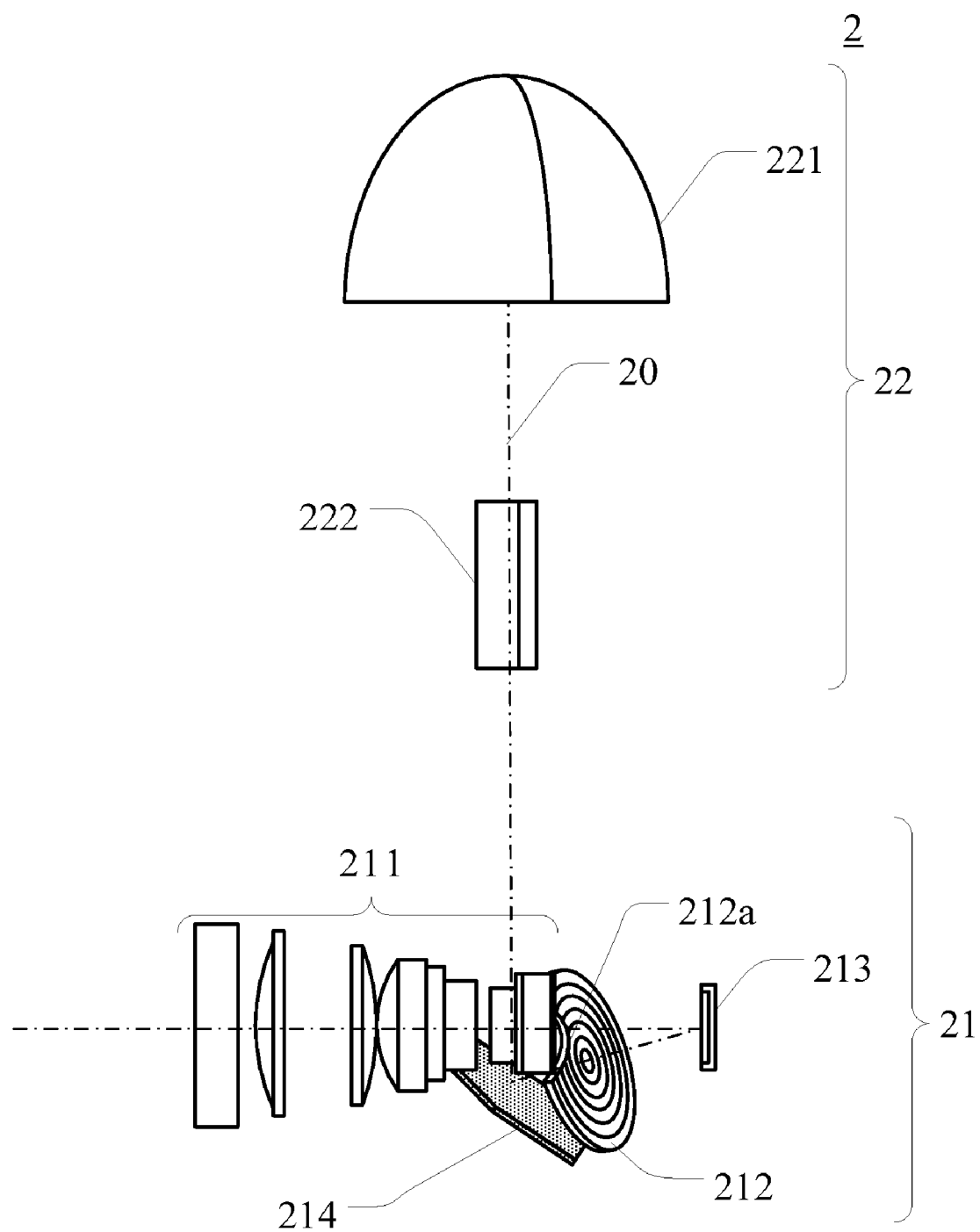
FIG. 2 is a schematic view of an optical engine of this invention.

As shown in FIG. 2, the preferred embodiment of an imaging system 21 of this invention is applied in an optical engine 2 used in a digital light processing (DLP) projection device (not shown). The optical engine 2 is in a Non-Telecentric configuration; however, the imaging system 21 of this invention may also be applied to other types of projection devices. The optical engine 2 comprises the imaging system 21 and an illumination system 22, in which the illumination system 22 comprises a light source 221 and a uniformizer 222. The light source 221 is adapted to generate a light ray 20, which is uniformized by the uniformizer 222 before entering into the imaging system 21. A mercury lamp, a tungsten filament lamp or even a light-emitting diode (LED), or any other light sources applicable to a projection device may be used as the light source 221, while an integration rod, a light tunnel or any other devices adapted for light uniformization may be used as the uniformizer 222. Therefore, no limitation is made herein.

The imaging system 21 comprises a lens assembly 211, a Fresnel lens 212, a light valve 213 and a reflective mirror 214. The light valve 213 is disposed in the light path between the light source 221 and the lens assembly 211. The light path between the light valve 213 and the light source 221 is defined as an illumination section, while the light path between the light valve 213 and the lens assembly 211 is defined as an imaging section. The light valve 213 has a reflective surface, which selectively reflects the light ray 20 received from the illumination section to the imaging section to form an image. More specifically, the light ray 20 generated by the light source 221 is uniformized by the uniformizer 222 of the imaging system 22 and impinges on the reflective mirror 214, which then reflects the light ray 20 to the Fresnel lens 212. The Fresnel lens 212 in turn focuses the light ray 20, in the direction of the illumination section, onto the reflective surface of the light valve 213. The focused light ray 20 is selectively processed by the micro-structures on the reflective surface of the light valve 213 into a light ray carrying an image. Then, the light ray carrying the image is reflected by the reflective surface to the lens assembly 211 to project the image. In this invention, the light valve 213 is a digital micromirror device (DMD). However, in other examples, the light valve 213 may also be a reflective LCD panel or other devices adapted to reflect and image the light ray 20.

As shown, to avoid the interference of the Fresnel lens 212 with the lens assembly 211 due to the very small angle between the illumination section and the imaging section, a receiving portion is formed in the Fresnel lens 212 to correspondingly receive at least one portion of the lens assembly 211. In this embodiment, the receiving portion is a depression 212a. However, in other examples, the receiving portion may be of other shapes adapted to avoid the interference of the Fresnel lens 212 with the lens assembly 211, and is not only limited to the shape of the depression 212a shown in the figures. Since this invention replaces the aspheric lens used in the imaging system of the conventional projection device with the Fresnel lens 212 which has a reduced thickness compared to the conventional aspheric lens, the area of the sectional surface of the depression 212a is remarkably reduced correspondingly. The reduction of the area of the sectional surface of the depression 212a compared to that of the prior art may result in an improved efficiency for utilizing the Fresnel lens 212 and thus, a remarkably reduced amount of stray light with no decrease in the brightness of the optical engine 2. In this invention, the Fresnel lens 212 has a thickness substantially ranging from 2 mm to 4 mm. Preferably, the thickness is 2 mm. The Fresnel lens 212 may be made of an appropriate material depending on the design requirements for the refractive index, for example, glass or transparent polymers, and will not be further described herein.

Figure 3:
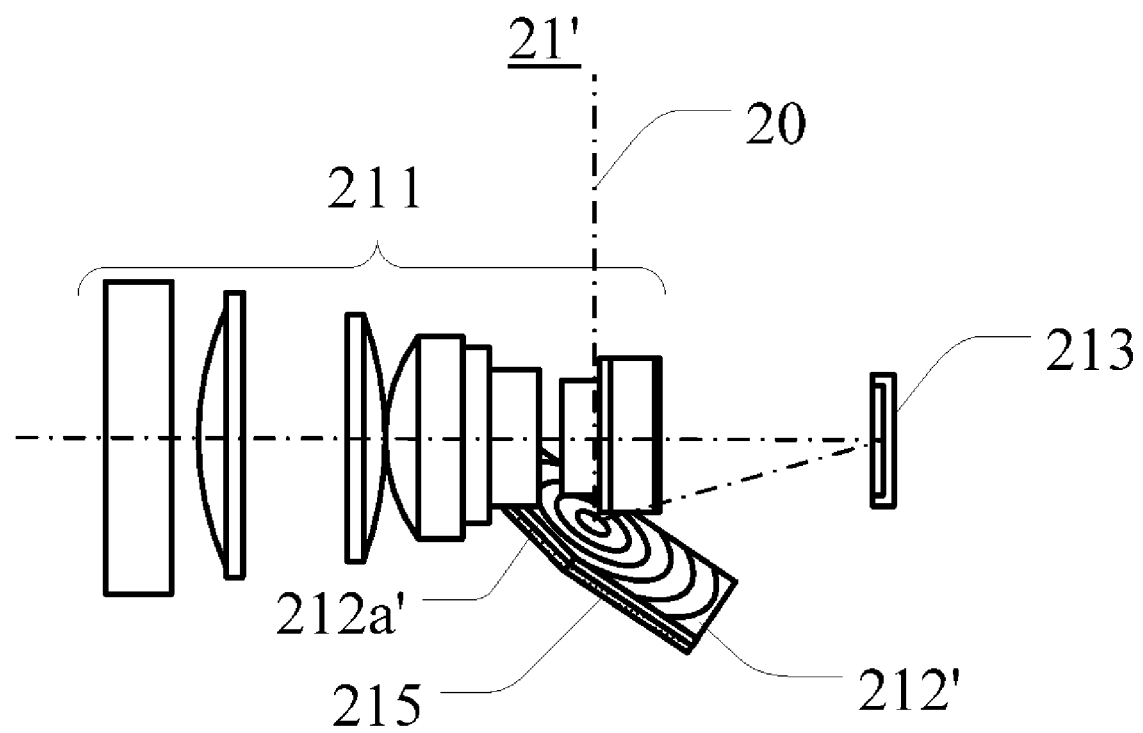
FIG. 3 is a schematic view of an imaging system according to another embodiment of this invention.

FIG. 3 depicts another embodiment of the imaging system of this invention. The imaging system 21' of this embodiment further comprises a reflective layer 215 formed on the Fresnel lens 212' to replace the reflective mirror 214 shown in FIG. 2. Here, corresponding modifications shall be made to the Fresnel lens 212', the Fresnel lens 212' with the reflective layer 215 is disposed at a location where the reflective mirror 214 shown as FIG. 2 would be otherwise disposed, so that the light ray 20 is reflected from the reflective layer 215 and focused by the Fresnel lens 212' onto the light valve 213. Similarly, the Fresnel lens 212' is formed with a depression 212a' adapted to correspondingly receive at least one portion of the lens assembly 211 to avoid interference with each other. It should be appreciated that the Fresnel lens 212' and the depression 212a' in FIG. 3 have different shapes from those of the Fresnel lens 212 and the depression 212a in FIG. 2, because varied locations of the Fresnel lens 212' and the depression 212a' in this embodiment necessitate the corresponding alteration of the shapes thereof to match the lens assembly 211 and other components. Therefore, it should be appreciated that the Fresnel lenses 212, 212' and the depressions 212a, 212a' depicted in these figures are not intended to limit scope of this invention.

In summary, this invention replaces the aspheric lens, used in conventional imaging systems, with a Fresnel lens. As compared to the prior art, this invention not only remarkably reduces the area of the receiving portion and amount of consequent stray light, but also shrinks the space of the optical engine 2 as a whole and saves the use of lens materials, which helps to cut down the cost. However, the Fresnel lens 212 is simply a thinned out lens that is easy to acquire, and any other currently existing optical components or future-developed optical components with the same or similar property as the Fresnel lens 212 can also be applied to the structure of this invention as an equivalent substitute. The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An imaging system for a projection device, comprising:
   a lens assembly;
   a Fresnel lens;
   a light valve, having a reflective surface opposite to the lens assembly and the Fresnel lens; and
   a reflective layer, formed on the Fresnel lens, wherein the Fresnel lens is located between the reflective layer and the light valve;
   wherein a light ray is reflected on the reflective layer, and focused onto the reflective surface of the light valve by the Fresnel lens, and reflected into the lens assembly by the reflective surface.

2. The imaging system as claimed in claim 1, wherein the Fresnel lens is formed with a receiving portion, in which the receiving portion is a depression formed inward from a periphery of the Fresnel lens, and at least one portion of the lens assembly is accommodated in the depression.

3. The imaging system as claimed in claim 1, wherein the light valve is a Digital Micromirror Device (DMD).

4. The imaging system as claimed in claim 1, wherein the Fresnel lens has a thickness between about 2 mm and 4 mm.

5. The imaging system as claimed in claim 4, wherein the thickness is about 2 mm.

6. The imaging system as claimed in claim 1, wherein the Fresnel lens is made of a material selected from the group consisting of glass and transparent polymers.

7. An optical engine, comprising the imaging system as claimed in claim 1 and an illumination system, wherein the illumination system comprises a light source adapted to generate the light ray.

8. The optical engine as claimed in claim 7, wherein the illumination system further comprises a uniformizer and the Fresnel lens receives the light ray after being transmitted through the uniformizer.

9. The optical engine as claimed in claim 7, wherein the optical engine is a Non-Telecentric optical engine.

* * * * *